(12) United States Patent
Nakabayashi et al.

(10) Patent No.: US 11,216,969 B2
(45) Date of Patent: Jan. 4, 2022

(54) SYSTEM, METHOD, AND COMPUTER-READABLE MEDIUM FOR MANAGING POSITION OF TARGET

(71) Applicant: OBAYASHI CORPORATION, Tokyo (JP)

(72) Inventors: Takuma Nakabayashi, Tokyo (JP); Tomoya Kaneko, Tokyo (JP); Masashi Suzuki, Tokyo (JP)

(73) Assignee: OBAYASHI CORPORATION, Tokyo (JP)

( * ) Notice: Subject to any disclaimer, the term of this patent is extended or adjusted under 35 U.S.C. 154(b) by 112 days.

(21) Appl. No.: 16/519,769

(22) Filed: Jul. 23, 2019

(65) Prior Publication Data

US 2021/0027481 A1 Jan. 28, 2021

(51) Int. Cl.
*G06K 9/00* (2006.01)
*G06T 7/70* (2017.01)

(52) U.S. Cl.
CPC .............. *G06T 7/70* (2017.01); *G06K 9/00664* (2013.01); *G06K 2209/21* (2013.01)

(58) Field of Classification Search
CPC ... G06T 7/70; G06K 9/00664; G06K 2209/21
USPC .......................................... 382/103–107, 154
See application file for complete search history.

(56) References Cited

U.S. PATENT DOCUMENTS

| | | | | |
|---|---|---|---|---|
| 2008/0306689 A1* | 12/2008 | Kourogi | ............... | G01C 21/165 382/107 |
| 2016/0026853 A1* | 1/2016 | Wexler | ................... | G06F 3/005 382/103 |
| 2016/0350921 A1* | 12/2016 | Bataller | ............. | G06K 9/00771 |
| 2017/0154219 A1* | 6/2017 | Shin | ......................... | B25J 13/08 |
| 2018/0152641 A1* | 5/2018 | Loosli | .................. | G06Q 40/025 |
| 2020/0145837 A1* | 5/2020 | Tran | ........................ | H04W 4/33 |

FOREIGN PATENT DOCUMENTS

| | | |
|---|---|---|
| JP | 2009-163578 A | 7/2009 |
| JP | 2012-088907 A | 5/2012 |
| JP | 2012-180191 A | 9/2012 |
| JP | 2013-54682 A | 3/2013 |
| JP | 2015-102880 A | 6/2015 |

OTHER PUBLICATIONS

JP Office Action in Application No. 2017-007861 dated Oct. 6, 2020.
Obayashi Corporation, Development of a "lifting control system" that shows the loading status of materials and equipment at a glance, Mar. 28, 2016, https://www.obayashi.co.jp/news/detail/news20160328_1.html.

\* cited by examiner

*Primary Examiner* — Andrew M Moyer
(74) *Attorney, Agent, or Firm* — Maschoff Brennan

(57) ABSTRACT

A system for managing a position of a target stores identification information for identifying a target to be managed in association with position information indicating a position of the target. The system further obtains an image from an image capture device attached to a mobile device and obtains the image captured by the image capture device at an image capture position and image capture position information indicating the image capture position. The system further locates the position of the target included in the image using the image capture position information. The system further stores the position of the target in association with the identification information of the target.

16 Claims, 5 Drawing Sheets

SYSTEM, METHOD, AND COMPUTER-READABLE MEDIUM FOR MANAGING POSITION OF TARGET

BACKGROUND

1. Field

The following description relates to a system, a method, and a computer-readable medium for managing the position of a target.

2. Description of Related Art

Apparatuses used in construction sites are used at different spots in accordance with working situations. Thus, the position of each apparatus needs to be precisely managed.

Conventionally, a technique for managing the operating situations of materials and devices has been proposed (refer to http://www.obayashi.co.jp/press/news20160328_1.html). In this technique, an integrated circuit (IC) tag reader installed in an elevator is used to read an IC tag carried by a construction worker or an IC tag attached to a device or the like. In this manner, for example, materials and devices that have been moved, as well as the movement timings and the movement destinations of the materials and devices are tracked and recorded.

Additionally, a technique for managing the situations of apparatuses used in construction sites has been proposed (refer to, for example, Japanese Laid-Open Patent Publication No. 2013-54682). In this technique, measurement information obtained from an acceleration sensor attached to an apparatus is used to determine the state of the apparatus.

When the above-described techniques for managing the situations of materials and devices are used to manage the materials and devices, an IC tag needs to be attached to each of the materials and devices of a target to be managed. Accordingly, materials and devices to which IC tags are not attached cannot be managed.

SUMMARY

It is an objective of the present disclosure to provide a system, a method, and a computer-readable medium for effectively ascertaining and managing the position of a target to be managed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system for managing a target is provided. The system includes circuitry configured to store identification information for identifying a target to be managed in association with position information indicating a position of the target, obtain an image from an image capture device attached to a mobile device, obtain the image captured by the image capture device at an image capture position and image capture position information indicating the image capture position, locate the position of the target included in the image using the image capture position information, and store the position of the target in association with the identification information of the target.

In another general aspect, a method for managing a target using a system including circuitry is provided. The method includes storing, by the circuitry, identification information for identifying a target to be managed in association with position information indicating a position of the target, obtaining, by the circuitry, an image from an image capture device attached to a mobile device, obtaining, by the circuitry, the image captured by the image capture device at an image capture position and image capture position information indicating at an image capture position, locating, by the circuitry, the position of the target included in the image using the image capture position information, storing, by the circuitry, the position of the target in association with the identification information of the target.

In a further general aspect, a non-transitory computer-readable medium that stores instructions is provided. The instructions, when executed by a system including circuitry, causes the circuitry to store identification information for identifying a target to be managed in association with position information indicating a position of the target, obtain an image from an image capture device attached to a mobile device, obtain the image captured by the image capture device at an image capture position and image capture position information indicating the image capture position, locate the position of the target included in the image using the image capture position information, store the position of the target in association with the identification information of the target.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A system, a method, and a computer-readable medium for managing the position of a target according to an embodiment will now be described with reference to FIGS. 1 to 7. In the present embodiment, a target to be managed is a movable apparatus used in a construction site (for example, welder or pump).

Figure 1:
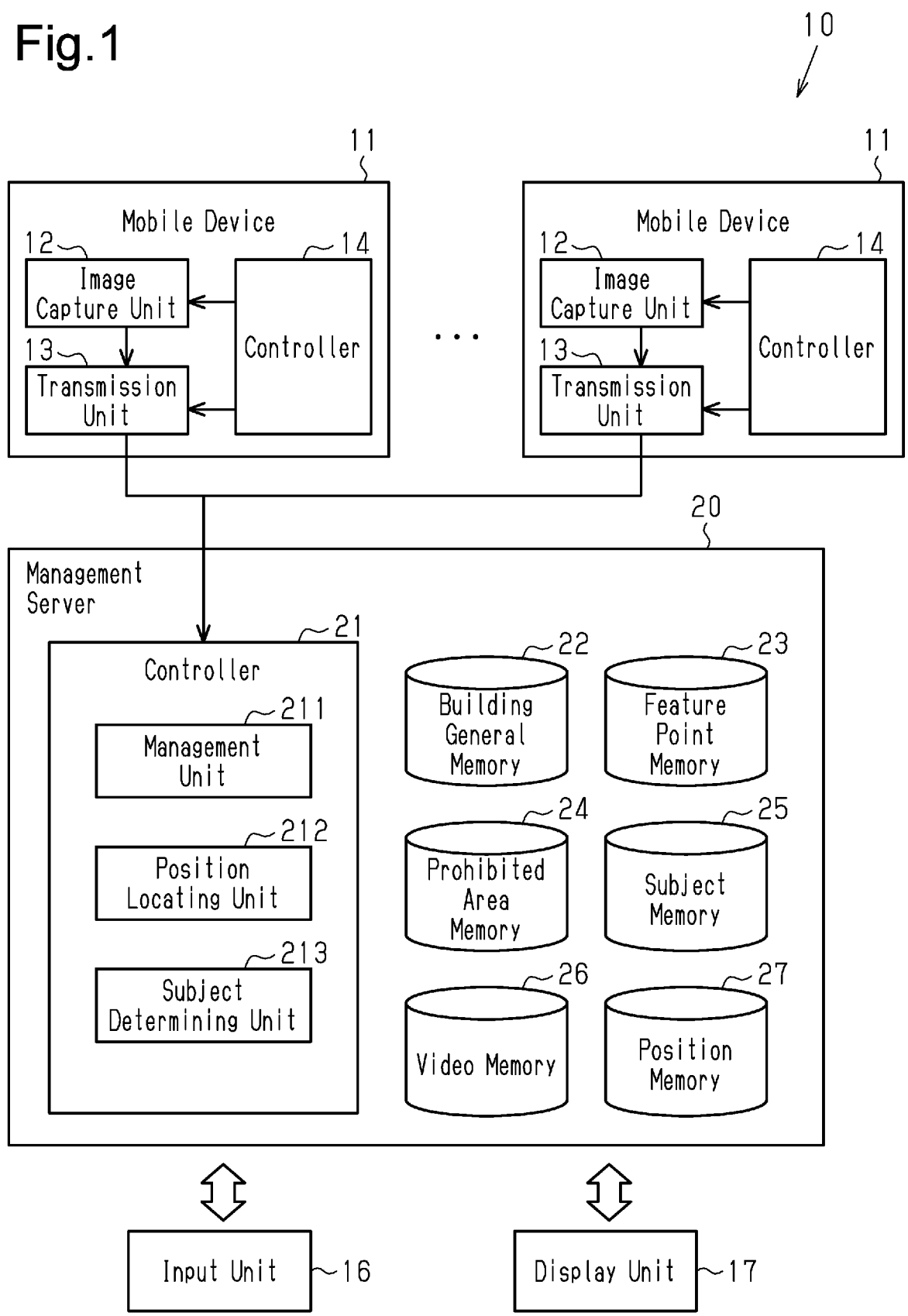
FIG. 1 is a diagram illustrating the entirety of a management system according to an embodiment.

As shown in FIG. 1, a management system 10 of the present embodiment includes a management server 20, which is connected to mobile devices 11.

Figure 2:
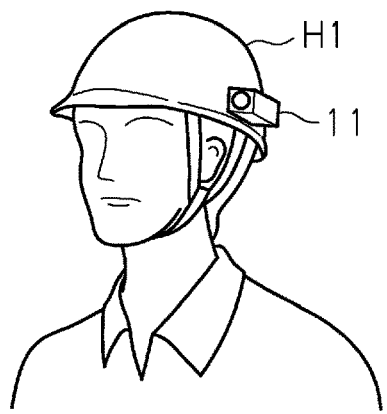
FIG. 2 is a perspective view illustrating a position at which the mobile device of FIG. 1 is attached.

As shown in FIG. 2, the mobile device 11 is a wearable terminal that serves as an image capture device. The mobile device 11 is attached to a side portion of a helmet H1, which is worn by a worker who is working while moving in a construction site.

As shown in FIG. 1, the mobile device 11 includes an image capture unit 12, a transmission unit 13, and a controller 14.

The image capture unit 12 is configured by, for example, a camera (for example, a charge coupled device (CCD) camera). The image capture unit 12 generates a video (image) by capturing the view from the front side of the worker.

The transmission unit 13 transmits the video captured by the image capture unit 12 to the management server 20 per predetermined size.

The controller 14 controls starting and stopping of image capture by the image capture unit 12 and controls starting and stopping of transmission or the like by the transmission unit 13. The controller 14 holds image capture device identification information for determining the mobile device 11.

The management server 20 includes an input unit 16 and a display unit 17. The input unit 16 is a keyboard or a pointing device (e.g., a mouse). The display unit 17 is a display that displays, for example, the position of a target.

The management server 20 includes a controller 21, a building general memory 22, a feature point memory 23, a prohibited area memory 24, a subject memory 25, a video memory 26, and a position memory 27.

The controller 21 includes, for example, a CPU, a RAM, and a ROM and performs processes described later (the processes of, for example, a management stage, a position locating stage, and a subject determining stage). By executing the management program for executing the processes, the controller 21 serves as a management unit 211, a position locating unit 212, and a subject determining unit 213.

The management unit 211 executes a process for managing the position of a target. In the present embodiment, the management unit 211 obtains a video captured by the mobile device 11 to manage a target using the video.

The position locating unit 212 estimates an image capture position and an image capture direction based on the video to execute a process for determining an image capture view. In the present embodiment, the position locating unit 212 locates an image capture position using known visual simultaneous localization and mapping (v-SLAM).

The subject determining unit 213 executes a process for determining a target corresponding to a subject (thing) in the determined image capture view and a state of the subject.

The subject determining unit 213 of the present embodiment uses a convolutional neural network of deep learning. More specifically, the subject determining unit 213 inputs images of divided regions in an image capture frame to a learned classification model generated through learning to determine a target to be managed and the state or material of the target. Because of this learning, the subject determining unit 213 stores the learned classification model, which has learned through the deep learning, in the subject memory 25 based on a known method using a vast amount of training data stored in the subject memory 25.

The building general memory 22 stores building general information related to a building under construction. In the present embodiment, building information modeling (BIM) data is used as the building general information. The building general information includes an object configuring a building, attribute information, and location information. An object includes a three-dimensional model to which an object ID is assigned. Attribute information includes information related to an object ID, an object name, and an object specification such as type, area, material properties, product information, and costs. Location information includes information related to the position (coordinates) where the object is arranged.

An object ID is an identifier that identifies an object.

An object name refers to the name of the object.

Type, area, material properties, product information, and costs refer to the type (structure type or fixture type), area, material properties, product information, and costs of an object.

Location information refers to data related to an identifier that identifies the place (construction area) where the object is arranged. A construction area is a group where dwelling units (rooms) of a building are integrated in terms of space (adjacent dwelling units) and time (working time) in order to gradually proceed with construction of the building. A construction area is set for, for example, the dwelling units on a floor or part of a floor of a building.

The feature point memory 23 stores information related to a feature point in a construction site used to locate the position (image capture position) of the mobile device 11. The feature point information is related to the feature of an image when captured from the inside of a building under construction. The feature point information includes a feature point identifier, the feature amount of an image that determines the feature point, and the position of the feature point (xyz-coordinates, i.e., three-dimensional coordinates).

The prohibited area memory 24 stores prohibited area information for determining an image capture prohibited area. The prohibited area information is registered in advance before execution of a management process, which will be described later. The prohibited area information includes data related to a prohibited area information identifier, area name, and position (coordinates) of the prohibited area. The image capture prohibited area is, for example, a bathroom used by a worker.

The subject memory 25 stores information used to determine a subject or determine the state of a subject. The information is registered in advance before execution of the management process, which will be described later.

Figure 3A:
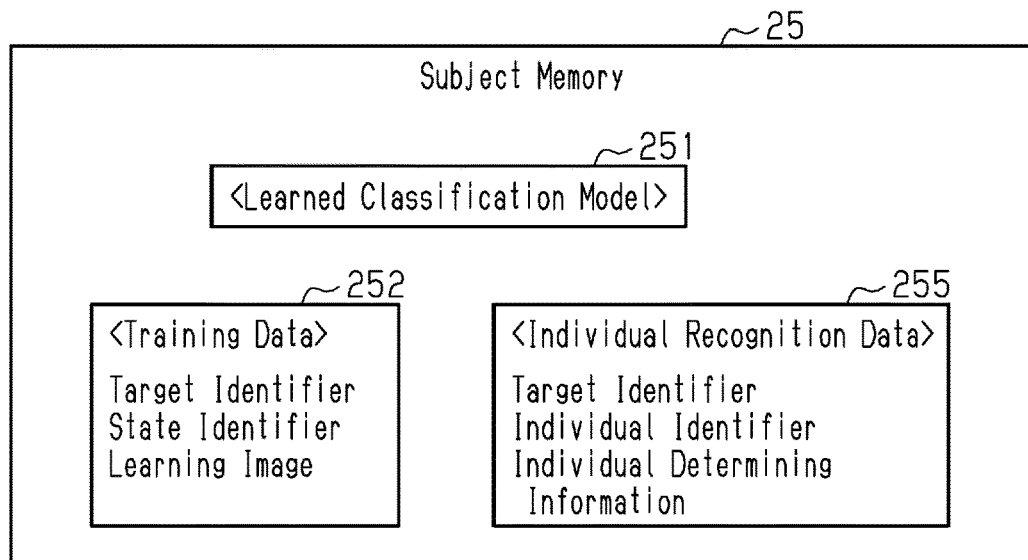
FIG. 3A is a diagram illustrating information stored in the subject memory of the management system shown in FIG. 1.

More specifically, as shown in FIG. 3A, the subject memory 25 stores a learned classification model 251, training data 252, and individual recognition data 255.

The learned classification model 251 is generated through deep learning that determines a target to be managed and the state of the target using the training data 252. The learned classification model 251 is associated with a target identifier and a state identifier.

A target identifier data region records data related to an identifier (a name in this case) that determines the type of a thing. The type of a thing is a construction element (for example, construction material or finishing) and a material used for construction, an apparatus used in a construction site (for example, welder or pump), or the like.

A state identifier data region records an identifier that determines the state of a subject determined by a target identifier. For example, when the subject is a welder, an identifier indicating whether the welder is being used is recorded.

The training data 252 is used to calculate a learned classification model of deep learning. The training data 252 includes data related to a target identifier and a state identifier, which are used as output layers, and a learning image, which is used as an input layer.

The target identifier data region and the state identifier data region respectively record data related to an identifier that determines the type of a target (thing) to be managed and data related to an identifier that determines the state of the target.

The individual recognition data 255 is used to recognize an individual such that the subject is distinguished from similar things (construction elements or apparatuses). The individual recognition data 255 includes data related to a target identifier, an individual identifier, and individual determining information.

The target identifier data region records data related to an identifier that determines the type of the target (for example, welder or pump).

An individual identifier data region records data related to an identifier that individually determines a target.

An individual determining information data region records information for distinguishing the target of an image from other similar individuals. The individual determining information is related to, for example, the color of a color marker assigned to the target or the position of the target.

Figure 3B:
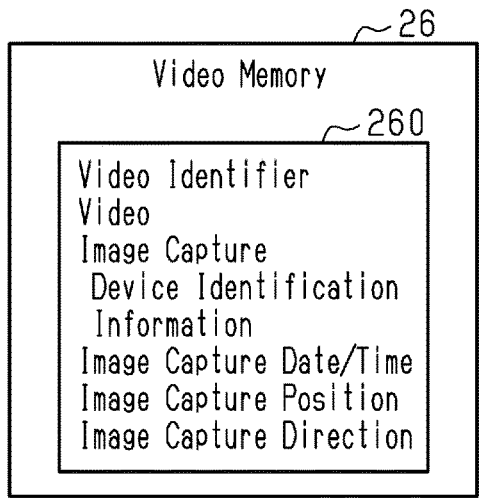
FIG. 3B is a diagram illustrating information stored in the video memory of the management system shown in FIG. 1.

As shown in FIG. 3B, the video memory 26 stores video management information 260, which is related to a video captured by the mobile device 11. The video management information 260 includes data related to a video identifier, video, image capture device identification information, image capture date/time, image capture position, and image capture direction.

A video identifier data region records data related to an identifier that determines a video.

A video data region records a video captured by the mobile device 11.

An image capture device identification information data region, an image capture date/time data region, an image capture position data region, and an image capture direction data region respectively record data related to the device that captured the video (mobile device 11), data related to a date/time on which the video was captured, data related to a position at which the video was captured, and data related to a direction in which the video was captured.

Figure 3C:
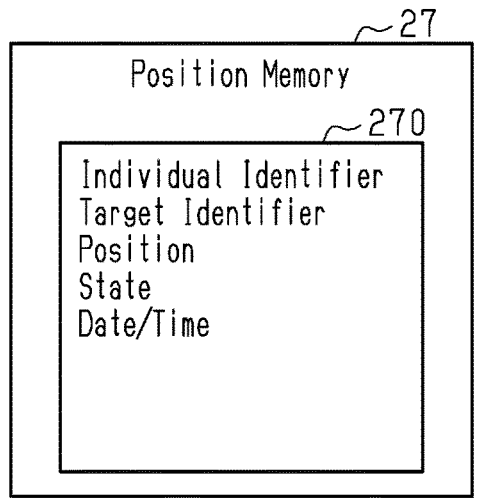
FIG. 3C is a diagram illustrating information stored in the position memory of the management system shown in FIG. 1.

As shown in FIG. 3C, the position memory 27 stores information related to the position of a target. This information is position information 270 registered when a target is delivered to a construction site. The position information 270 includes data related to an individual identifier, a target identifier, a position, a state, and a date/time.

The individual identifier data region records data related to an identifier that determines a target.

The target identifier data region records data related to an identifier that determines the type of the target.

A position data region records data related to the position at which the target was detected.

A state data region records data related to the state of the target.

A date/time data region records data related to the year, month, day, and time on which the target was detected at the position.

Management Process

Figure 4:
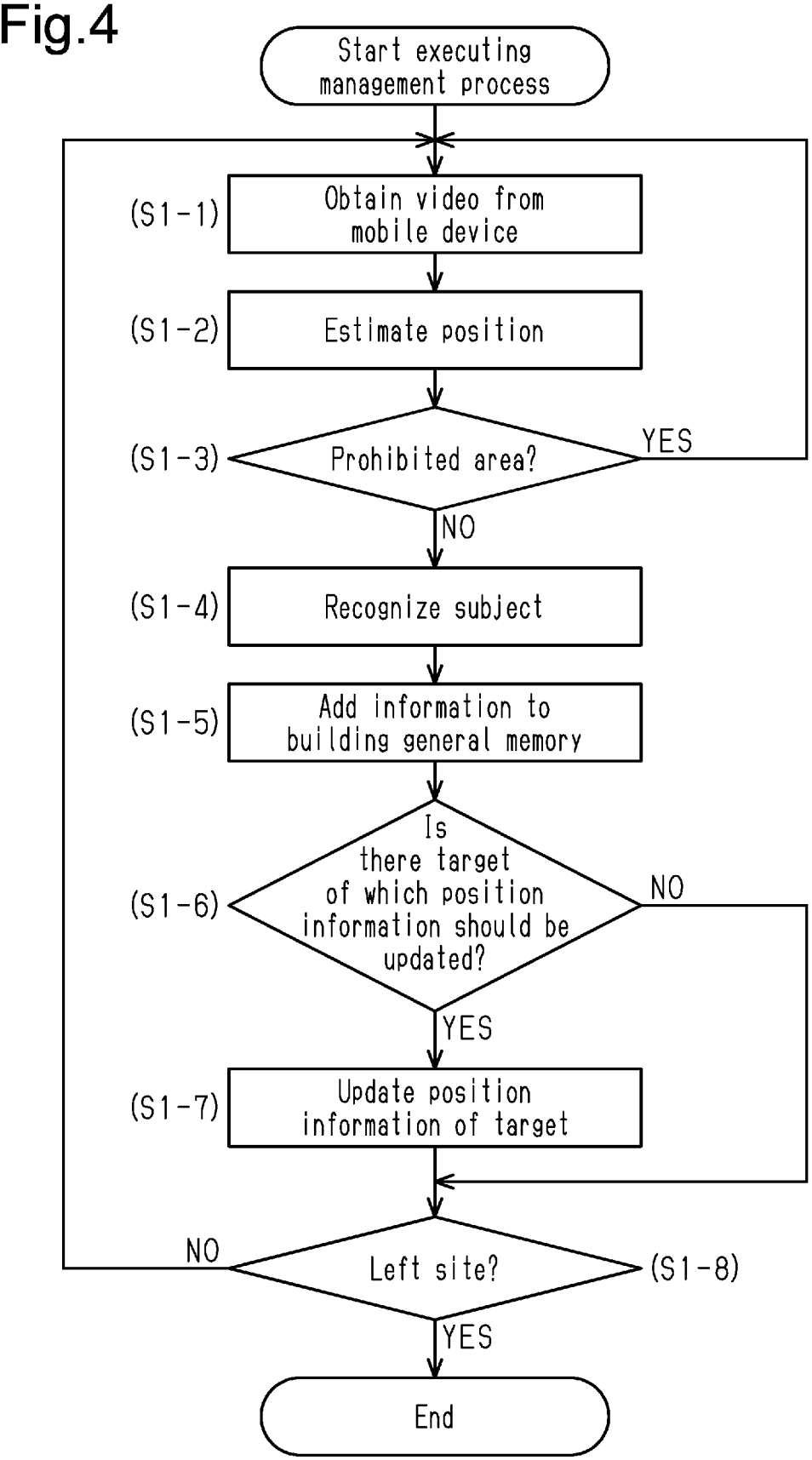
FIG. 4 is a flowchart illustrating the procedure of a management process in the management system of FIG. 1.

The management system for managing a target using the management system 10 will now be described with reference to FIG. 4.

When a worker starts working in a construction site, the worker activates the mobile device 11, which is attached to the helmet H1. In this case, the controller 14 of the mobile device 11 starts capturing a video by the image capture unit 12 and records the captured video in a memory. The memory records the video identifier and the image capture date/time in association with the video. Then, the controller 14 transmits the video recorded in the memory and the image capture device identification information to the management server 20 via the transmission unit 13 per predetermined size.

The controller 21 of the management server 20 executes a process for obtaining a video from the mobile device 11 (step S1-1). More specifically, the management unit 211 of the controller 21 receives a video having a predetermined size and the image capture device identification information from the mobile device 11. Then, the management unit 211 generates the video management information 260, which includes the received video, video identifier, image capture date/time, and image capture device identification information, and stores the video management information 260 in the video memory 26.

Next, the controller 21 executes a position estimation process (step S1-2). More specifically, the position locating unit 212 of the controller 21 determines, as a candidate feature point, a feature point that is likely to be shown in the current frame among feature points used to locate the most recent position. The position locating unit 212 uses multiple pieces of frame information to predict the movement direction and amount of the worker and determine the candidate feature point based on the predicted movement direction and amount. The position locating unit 212 searches for a feature point that matches the feature amount of the candidate feature point in the current frame (image). When determining the matching featured point, the position locating unit 212 uses the position of the determined feature point (xyz-coordinates) to locate the image capture position and the image capture angle and records the position and angle in the video management information 260. The position locating unit 212 determines the image capture range (image capture view) from the image capture position and angle and from the image.

Subsequently, the controller 21 executes a process for determining whether the image capture position is located in the image capture prohibited area (step S1-3). More specifically, the management unit 211 determines whether the image capture area is included in the prohibited area by comparing the estimated image capture position with the position (coordinates) of the prohibited area information of the prohibited area memory 24.

When determining that the image capture position is located in the image capture prohibited area ("YES" in step S1-3), the controller 21 deletes the video obtained from the mobile device 11. Then, the controller 21 waits for receipt of the next video.

When determining that the image capture position is located out of the image capture prohibited area ("NO" in step S1-3), the controller 21 executes a subject recognition process (step S1-4). The subject determining unit 213 of the controller 21 determines, for example, a subject (thing) included in the frame, the position of the subject, and the information for recognizing the subject (object ID or individual identifier). The detail of the subject recognition process will be described below.

Subsequently, the controller 21 executes an information adding process for the building general memory (step S1-5). More specifically, when the frame includes a subject to which an object ID is assigned, the management unit 211 stores, as the attribute information of the object of the building general information corresponding to the object ID, the image, the image capture date/time, and the position and state of the subject in the building general memory 22.

Afterwards, a determination process is executed to determine whether there is a target of which the position information should be updated (step S1-6). More specifically, the management unit 211 determines that there is a target to be updated when the frame includes a subject to which a target identifier has been assigned.

When determining that there is a target of which the position information should be updated ("YES" in step S1-6), the controller 21 executes a process for updating the position information of the target (step S1-7). More specifically, the management unit 211 searches the position memory 27 for the position information 270 of the latest date/time, which includes the target identifier and the individual identifier determined in the frame. When the corresponding position of the position information 270 differs from the located position, the management unit 211 generates new position information 270 and stores it in the position memory 27. In this case, the management unit 211 incorporates, into the position information 270, the individual identifier, target identifier, position, state, and date/time (image capture date/time).

Further, when determining only the target identifier, the management unit 211 searches for the position information 270 including the same target identifier and the same position. When extracting the corresponding position information 270, the management unit 211 updates the date/time of the position information 270 to the image capture date/time of the newly determined image. When the management unit 211 does not extract the corresponding position information 270, the management unit 211 generates new position information 270 and stores it in the position memory 27.

When determining that there is no target of which the position information should be updated ("NO" in step S1-6), the controller 21 skips the process of step S1-7.

The controller 21 executes a process for determining whether the worker has left the site (step S1-8). When the worker leaves the site, the mobile device 11 receives a leaving input. In this case, the controller 14 of the mobile device 11 determines that the worker has left the site and transmits leaving information to the management server 20. When the controller 21 does not receive the leaving information and determines that the worker has not left the site ("NO" in step S1-8), the controller 21 continues the processes subsequent to step S1-1.

When receiving the leaving information and determines that the worker has left the site ("YES" in step S1-8), the management unit 211 ends the management process.

Subject Recognition Process

Figure 5:
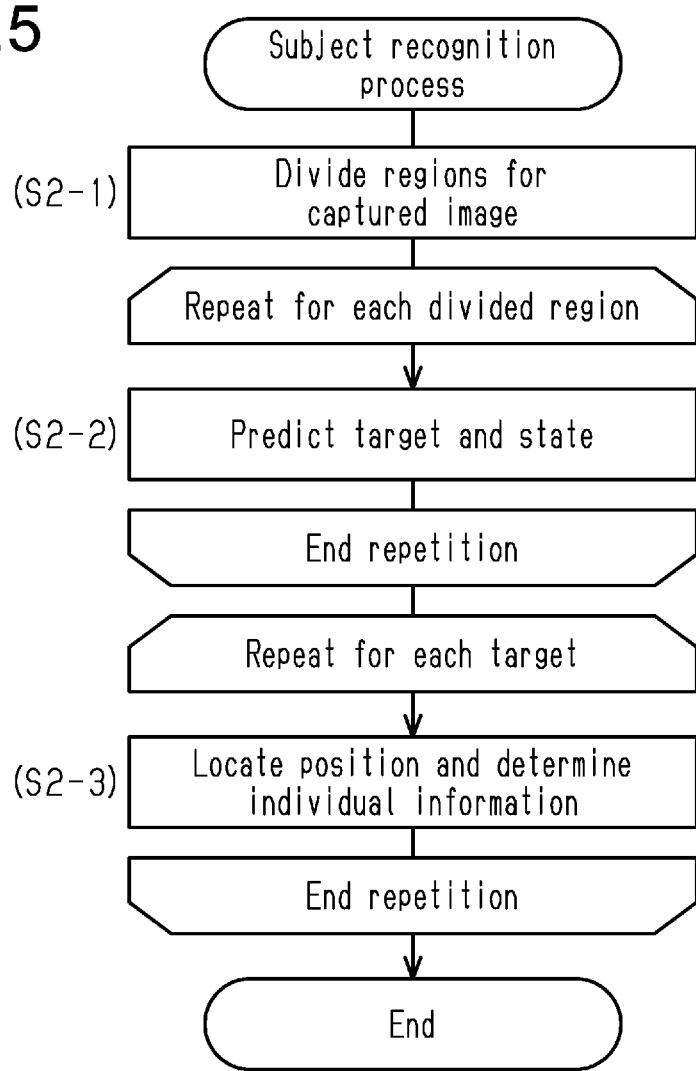
FIG. 5 is a flowchart illustrating the procedure of a subject recognition process in the management system of FIG. 1.

The above-described subject recognition process (step S1-4) will now be described with reference to FIG. 5.

First, the controller 21 executes a region division process for a captured image (step S2-1). More specifically, the subject determining unit 213 uses a known method to divide multiple regions included in each frame (image) of a captured video. The subject determining unit 213 divides the regions using, for example, the edges included in the captured image or the hue information and saturation information of a pixel.

The controller 21 sequentially determines each divided region as a target to be processed and repeats the next process.

The controller 21 executes a process for predicting a target and a state (step S2-2). More specifically, the subject determining unit 213 sets the image of each divided region as an input value and determines the target and state or the material using the learned classification model 251, which is stored in the subject memory 25. In a case in which the target and state of, for example, a pillar, a wall, or a floor cannot be determined through deep learning but the material thereof can be determined through deep learning, the material is determined.

Figure 6:
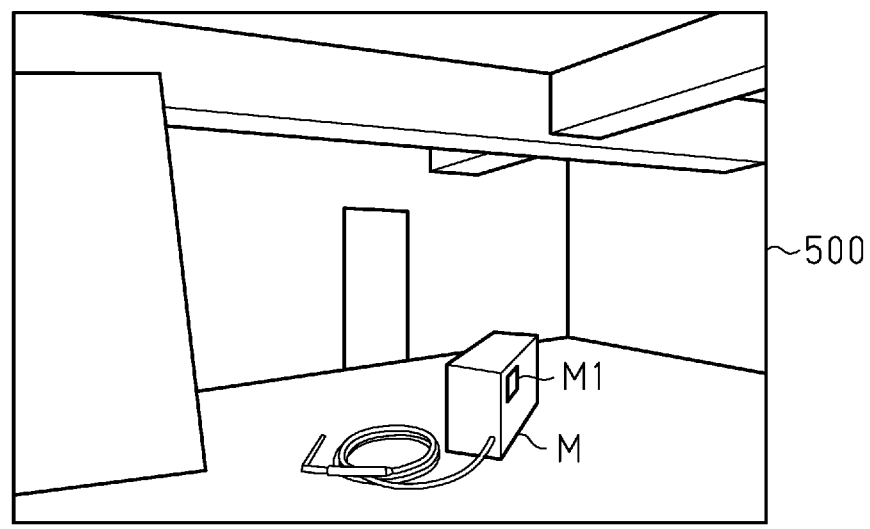
FIG. 6 is a diagram illustrating an image for determining a target to be managed in the management system of FIG. 1.

An exemplary image 500 is obtained and shown in FIG. 6. In this case, the controller 21 generates multiple divided regions based on the contour of the image. The type and state of the target is determined through deep learning. For example, as shown in FIG. 6, a welder M, which is currently not in use and serves as the target, is determined at the central position of the image. In the deep learning, learning is performed using an image in which sparks are being generated (the welder M, which is currently in use), thereby determining a usage state.

Then, the controller 21 sequentially determines each subject (each target) as a target to be processed and repeats the following processes.

First, the controller 21 executes a process for locating the position and determining individual information (step S2-3). More specifically, the subject determining unit 213 uses the image capture position and the image capture direction to locate the position of the subject of the image and store the position in the memory of the controller 21. The subject determining unit 213 executes a process for determining whether the building general memory 22 stores an object corresponding to the target identifier of the subject at the position of the subject. When the corresponding object is stored, the object ID of the object is determined and stored in the memory of the controller 21.

When the corresponding object is not stored in the building general memory 22, the subject determining unit 213 searches the image of the subject for an image part corresponding to individual determining information. When the image part includes the individual determining information, the subject determining unit 213 determines the individual identifier of the individual recognition data 255, where the individual determining information is recorded, and stores the individual identifier in the memory of the controller 21.

For example, in the image 500 shown in FIG. 6, when the welder M is determined, it is determined whether the image of the welder M in the image 500 includes the individual determining information of the welder. When a marker M1 of the individual determining information is detected from the image of the welder M, the subject determining unit 213 determines the individual identifier corresponding to the individual determining information.

Position Confirmation Process

Figure 7:
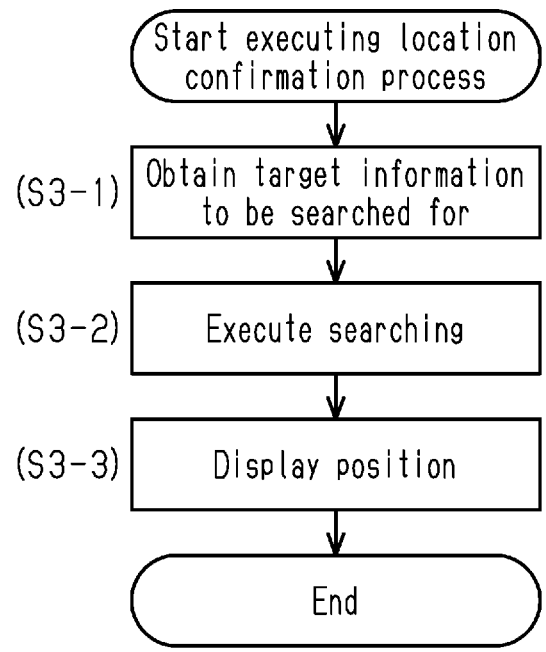
FIG. 7 is a flowchart illustrating the procedure of a position confirmation process in the management system of FIG. 1.

The process for confirming the position of a target will now be described with reference to FIG. 7. For example, it is assumed that the worker confirms the position of a target, such as an apparatus used for a task that the worker is about to begin.

First, the controller 21 executes a process for obtaining target information to be searched for (step S3-1). More specifically, the management unit 211 displays a search screen on the display of the display unit 17. The search screen includes the entry field for a search target and includes a search execution button. The individual identifier and the target identifier can be used as the search target. The worker uses the input unit 16 to input, on the entry field of the search screen, information related to the target of which the position is to be confirmed and select the search execution button.

The controller 21 executes a search execution process (step S3-2). More specifically, the management unit 211 extracts, from the position memory 27, the position information 270 including an individual identifier or a target identifier corresponding to the obtained search target information.

The controller 21 executes a process for displaying the position of the target (step S3-3). More specifically, the management unit 211 displays, on the display of the display unit 17, the three-dimensional model of a building corresponding to the progress of the current construction. The management unit 211 displays, on the three-dimensional model, the position of a target corresponding to the search target information. In this case, when state-related information is recorded in the extracted position information 270, the management unit 211 displays the position with the state-related information. This allows the worker to ascertain the position of a target.

The present embodiment has the following advantages.

(1) The controller 21 determines a subject included in a captured image and locates the position of the subject in the subject recognition process (step S1-4) and executes the process for updating the position information of the target (step S1-7). Thus, the position of a target can be efficiently ascertained and managed using the mobile device 11.

(2) The controller 21 determines the usage state of a target in the subject recognition process (step S1-4) and executes the process for updating the position information of the target (step S1-7). This allows the usage state of a target to be effectively ascertained.

(3) The controller 21 executes the process for predicting a target and a state (step S2-2) and then executes the process for locating the position and determining individual information (step S2-3). This allows for management of an individual by determining a subject (thing) from an image and also by distinguishing the subject from other similar things.

(4) The mobile device 11 is a wearable terminal serving as an image capture device. The mobile device 11 is attached to the side of the helmet H1, which is worn by a worker who is working while moving in a construction site. Thus, a worker can ascertain the position of a target located around the worker only by moving for doing a task.

(5) When determining that the image capture position is located in the image capture prohibited area ("YES" in step S1-3), the controller 21 deletes the video. This allows for automatic deletion of an image in the image capture prohibited area so that the image will not be saved.

(6) The controller 21 executes the process for obtaining target information to be searched for, the search execution process, and the process for displaying the position (steps S3-1 to S3-3). This allows the current position of the searched target to be displayed.

The above-described embodiment may be modified as follows.

In the above-described embodiment, the controller 21 uses v-SLAM to locate an image capture position and angle. Instead, an image capture position and angle may be located using, for example, pedestrian dead reckoning (PDR). In this case, the mobile device 11 is provided with, for example, an acceleration sensor and a gyro sensor. The acceleration sensor detects, in three axes, acceleration information (for example, direction and magnitude of acceleration) of acceleration applied to the mobile device 11. The gyro sensor detects, in the three axes, angular velocity information (for example, direction and magnitude of angular velocity) of angular velocity applied to the mobile device 11. The transmission unit 13 transmits the detection values of the acceleration sensor and the gyro sensor when capturing an image and transmits the detection values and the image to the management server 20. Instead of individual acceleration sensors and gyro sensors, an inertial measurement unit (IMU) that includes those sensors and optionally other sensors may be used. Also, the IMU may be used with the v-SLAM. In this case, more robust position estimation is enabled by using information from the IMU in addition to the information from the image obtained with the v-SLAM.

In the above-described embodiment, the controller 21 executes the position estimation process (step S1-2) and the process for determining the image capture prohibited area (step S1-3). These processes may be executed by the mobile device 11. In this case, when the controller 14 of the mobile device 11 determines that the image capture position is located in the image capture prohibited area, image capture may be stopped. More specifically, when the controller 14 determines that the image capture position is located in the image capture prohibited area, image capture is suspended for a predetermined period of time.

Alternatively, a warning may be output to indicate that the image capture position is located in the image capture prohibited area. When the warning goes off, the worker stops capturing an image.

When the controller 14 determines that the worker has left the image capture prohibited area in the position estimation process, the controller 14 resumes capturing of an image and transmission of an image to the management server 20.

As another option, the mobile device 11 may be provided with a cover (for example, lens cover) that opens and closes an opening of the image capture device, from which light is taken in. When the controller 14 determines that the worker has arrived at the image capture prohibited area, the controller 14 controls the cover to move to close the opening.

In the above-described embodiment, the image capture unit 12 of the mobile device 11 captures the view from the front side of a worker wearing the helmet H1, to which the mobile device 11 is attached. Instead, image capture may be performed at the rear side or in the lateral direction relative to the worker's travelling direction. Alternatively, image capture may be performed for the half circumference (180 degrees) or the entire circumference (360 degrees).

In the above-described embodiment, a target to be managed is a movable apparatus used in a construction site such as a welder or a pump. Instead, a target may be a building material such as an aerial work platform or a scaffold. Additionally, a target is not limited to a thing and may be a person. In addition, situations such as the progress of the construction and the process may be determined based on the target and the state of the target that are determined based on the images. In this case, the controller 21 determines the situation based on data about the association between the process of the construction and the target.

In the above-described embodiment, the controller 21 of the management server 20 locates the position of a target to manage the target. In addition, the controller 21 may manage the position (current position) of a worker who wears the helmet H1, to which the mobile device 11 is attached. In this case, the controller 21 stores a worker identification table for determining a worker. Further, the management server 20 includes a worker memory that stores the position of a worker. In the worker identification table, image capture device identification information for determining the mobile device 11 is associated with worker identification information for determining a worker. The worker uses the helmet H1, to which the mobile device 11 is attached, for the associated image capture device identification information in the worker identification table. When locating the image capture position of the image, the management server 20 uses the worker identification table to determine a worker identifier corresponding to the image capture device identification information obtained with the image. The located image capture position is associated with the worker identifier and stored in the worker memory. Thus, in addition to the target, the position of the worker who has captured the image can also be managed.

In the above-described embodiment, the mobile device 11 is separate from the helmet H1. Instead, a smart helmet may be used. In the smart helmet, the devices of the mobile device 11 are all integrated with the helmet H1.

In the above-described embodiment, the controller 21 uses an image to determine a usage state in the process for predicting a target and a state (step S2-2). However, a usage state does not have to be determined using an image. For example, the usage state of a target may be determined using information by which an image is accompanied, such as sound included in a video. In this case, the controller 21 uses deep learning to determine the sound generated when the target is used. In this case, the frequency characteristics of the generated sound are used to learn the state of the target.

In the above-described embodiment, the controller 21 locates the position of a target based on an image obtained from the mobile device 11. Additionally, the controller 21 may output, to, the display unit 17, a warning for a target of which the position has not been confirmed for a long period of time. More specifically, a non-confirmation period is kept in the controller 21. The controller 21 periodically calculates, from the current date/time, a final confirmation reference date/time prior to a period corresponding to the non-confirmation period. Further, the controller 21 uses the position memory 27 to determine the final date/time during which the position was confirmed (position confirmation date/time) for each individual identifier. The controller 21 searches for an individual identifier in which the position confirmation date/time subsequent to the final confirmation reference date/time is not recorded. When extracting the individual identifier in which the position confirmation date/time subsequent to the final confirmation reference date/time is not recorded, the controller 21 displays the individual identifier of the position information 270 on the display unit. This urges the worker to review management of an unused target of which the position has not been confirmed for a long period of time.

In the subject recognition process of the above-described embodiment, the subject determining unit 213 executes the region division process for a captured image (step S2-1) and executes the process for predicting a target and a state for each divided region (step S2-2). Instead, the process for predicting a target and a state may be executed through region extraction by detecting an object.

The process for predicting a target and a state is executed using deep learning. Instead, the process for predicting a target and a state may be executed using, for example, known scale-invariant feature transform (SIFT) as long as the target and the state can be determined using an image.

In the above-described embodiment, the controller 21 locates an image capture position from an image. The image capture position information for locating the position at which an image has been captured is not limited to image information. Instead, the image capture position information may be, for example, information obtained from a global positioning system (GPS).

In the above-described embodiment, the controller 21 obtains a captured video from the mobile device 11. However, an image used to manage a target by the controller 21 is not limited to a video and may be, for example, a still image captured in a predetermined time interval. In addition, the mobile device 11 transmits the video captured by the image capture unit 12 to the management server 20 per predetermined size. Alternatively, the mobile device 11 may transmit the captured video to the management server 20 collectively, for example, after the worker has left the site. Furthermore, the mobile device 11 may transmit the video to the management server 20 by streaming.

The controller 14 or 21 is not limited to one that performs software processing on all processes executed by itself. For example, the controller 14 or 21 may include a dedicated hardware circuit (for example, application specific integrated circuit: ASIC) that executes hardware processing on at least part of the processes executed by itself. That is, the controller 14 or 21 may be circuitry including: 1) one or more processors that operate according to a computer program (software); 2) one or more dedicated hardware circuits that execute at least part of various processes, or 3) a combination thereof. The processor includes a CPU and memories such as a RAM and a ROM. The memories store program codes or instructions configured to cause the CPU to execute processes. The memories, or computer readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A system for managing a position of a target, the system comprising circuitry configured to:
obtain an image captured at an image capture position by an image capture device attached to a mobile device;
determine, based on the image, a candidate feature point which is a candidate of feature point included in the image;

determine a feature point by searching for the feature point in the image, the feature point having a feature amount that matches the feature amount of the candidate feature point;

determine the image capture position and an image capture angle of the image based on a position of the determined feature point;

locate a position of a target to be managed that is included in the image using the determined image capture position and the determined image capture angle; and store position information that indicates the position of the target in association with the identification information of the target.

2. The system according to claim 1, wherein the circuitry is further configured to:

determine a usage state of the target based on the image; and store the usage state in association with the identification information and the position of the target.

3. The system according to claim 1, wherein the circuitry is further configured to:

store the image capture position as the position of the mobile device.

4. The system according to claim 3, wherein the circuitry is further configured to stop image capture by the image capture device when the position of the mobile device is included in an image capture prohibited region.

5. A method for managing a position of a target using a system comprising circuitry, the method comprising:

obtaining, by the circuitry, an image captured at an image capture position by an image capture device attached to a mobile device;

determining, based on the image, a candidate feature point which is a candidate of feature point included in the image;

determining a feature point by searching for the feature point in the image, the feature point having a feature amount that matches the feature amount of the candidate feature point;

determining the image capture position and an image capture angle of the image based on a position of the determined feature point;

locating, by the circuitry, a position of a target to be managed that is included in the image using the determined image capture position and the determined image capture angle; and storing, by the circuitry, position information that indicates the position of the target in association with the identification information of the target.

6. The method according to claim 5, further comprising:
determining, by the circuitry, a usage state of the target based on the image; and
storing, by the circuitry, the usage state in association with the identification information and the position of the target.

7. The method according to claim 5, further comprising:
storing, by the circuitry, the image capture position as the position of the mobile device.

8. The method according to claim 7, further comprising:
stopping image capture by the image capture device when the position of the mobile device is included in an image capture prohibited region.

9. A non-transitory computer-readable medium that stores instructions, wherein the instructions, when executed by a system comprising circuitry, causes the circuitry to:

obtain an image captured at an image capture position by an image capture device attached to a mobile device;

determine, based on the image, a candidate feature point which is a candidate of feature point included in the image;

determine a feature point by searching for the feature point in the image, the feature point having a feature amount that matches the feature amount of the candidate feature point;

determine the image capture position and an image capture angle of the image based on a position of the determined feature point;

locate a position of a target to be managed that is included in the image using the determined image capture position and the determined image capture angle; and store position information that indicates the position of the target in association with the identification information of the target.

10. The non-transitory computer-readable medium according to claim 9, the instructions further causes the circuitry to:

determine a usage state of the target based on the image; and store the usage state in association with the identification information and the position of the target.

11. The non-transitory computer-readable medium according to claim 9, the instructions further causes the circuitry to:

store the image capture position as the position of the mobile device.

12. The non-transitory computer-readable medium according to claim 11, the instructions further causes the circuitry to:

stop image capture by the image capture device when the position of the mobile device is included in an image capture prohibited region.

13. The system according to claim 1, wherein the circuitry is further configured to:

store the image capture position as the position of the mobile device; and delete the image when the position of the mobile device is included in an image capture prohibited region.

14. The system according to claim 1, wherein the circuitry is further configured to:

store detection date and time, on which the target to be managed was detected at the position, in association with the identification information and the position information; and output an alert for the target to be managed when the detection date and time is not within a predetermined period from a current date and time.

15. The system according to claim 1, wherein the image capture position is within a building, the image is an image in which the inside of the building is captured, and the position information indicates three-dimensional position of the target in the building.

16. The system according to claim 1, wherein the circuitry is configured to determine the candidate feature point by:

predicting a movement direction of the mobile device and a movement amount of the mobile device, and determining the candidate feature point based on the predicted movement direction and the predicted movement amount.

* * * * *